US006538770B1

(12) United States Patent
Mestha

(10) Patent No.: US 6,538,770 B1
(45) Date of Patent: Mar. 25, 2003

(54) COLOR PRINTER COLOR CONTROL SYSTEM USING DUAL MODE BANNER COLOR TEST SHEETS

(75) Inventor: Lingappa K. Mestha, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,263

(22) Filed: Nov. 24, 1999

(51) Int. Cl.$^7$ .............................................. G06F 13/00
(52) U.S. Cl. ....................................... 358/1.9; 358/504
(58) Field of Search ........................ 358/1.1, 1.9, 1.14, 358/406, 504, 474, 501, 538, 540; 399/84; 382/317

(56) References Cited

U.S. PATENT DOCUMENTS

| | | | |
|---|---|---|---|
| 5,137,364 A | 8/1992 | McCarthy ................... 356/402 |
| 5,316,279 A | 5/1994 | Corona et al. ............... 270/1.1 |
| 5,450,165 A | * 9/1995 | Henderson .................. 399/49 |
| 5,547,178 A | 8/1996 | Costello ................... 270/52.02 |
| 5,604,567 A | 2/1997 | Dundas et al. ................ 399/39 |
| 5,612,902 A | 3/1997 | Stokes ........................ 364/526 |
| 5,748,221 A | 5/1998 | Castelli et al. .............. 347/232 |
| 5,760,913 A | * 6/1998 | Falk ........................... 358/504 |
| 5,963,244 A | 10/1999 | Mestha et al. .............. 347/251 |
| 6,157,469 A | 12/2000 | Mestha ....................... 358/504 |
| 6,178,007 B1 | 1/2001 | Harrington ................. 358/1.9 |
| 6,415,117 B1 | * 7/2002 | Bates et al. .................. 399/84 |

FOREIGN PATENT DOCUMENTS

EP 0 854 638 A2 7/1998

OTHER PUBLICATIONS

Website product literature, "DTP41 AutoScan Spectrophotometer," http://www.xrite.com/Products/Product.asp-?Show=Description&id=21, and a sample color test print sheet with test color patches for the "X–Rite," Model DTP41 sensor.

* cited by examiner

Primary Examiner—Mark Wallerson

(57) ABSTRACT

A dual mode banner sheet and color test sheet system for a color printer which is automatically printing and outputting banner sheets ahead of respective print jobs with identifying information, where the color printer also has a color measurement system with a spectrophotometer mounted in the printer output path and a color test prints generation system periodically printing multiple different color test patches on test sheets to be measured by the spectrophotometer, those color test sheets may be provided by dual mode sheets by coordinating the banner sheet printing system and the color test prints generation system to print both the banner sheet information and the multiple color test patches in different areas of the same sheets so as to not overprint one another, thus saving the paper and printing interruptions previously required for multiple separate color test sheets, yet providing for frequent color recalibrations of the printer. The multiple different color test patches may be printed in a limited area of these dual mode sheets extending across the mode sheet in the process direction.

11 Claims, 5 Drawing Sheets

COLOR PRINTER COLOR CONTROL SYSTEM USING DUAL MODE BANNER COLOR TEST SHEETS

Cross-reference is made to the following commonly assigned U.S. patent applications, both filed on Nov. 24, 1999, with related subject matter disclosures: U.S. application Ser. No. 09/448,774, entitled "Spectrophotometer for Color Printer Color Control with Displacement Insensitive Optics," by Fred F. Hubble, III and Joel A. Kubby, abandoned, now U.S. application Ser. No. 09/535,007, filed Mar. 23, 2000; and U.S. application Ser. No. 09/448,987, now U.S. Pat. No. 6,351,308, issued Feb. 26, 2002, entitled "Color Printer Color Control System with Automatic Spectrophotometer Calibration System," by Lingappa K. Mestha; respectively.

This disclosure relates to an improved on-line color measurement and control system for color printers, especially, for providing frequently updated color correction information for a color printer from a spectrophotometer in the output path of a color printer which is measuring the colors on color test patches printed on test sheets, wherein reduced wastage of paper for said printed test sheets, and reduced interruptions of normal printing, is provided by printing both banner sheet information and said color test patches on dual mode banner sheets.

As is well known in the art, it is a common practice, especially in shared user or system printers, to automatically generate and output an identifying banner sheet ahead of each individual print job being printed and outputted. Examples of banner sheets and their generation are disclosed, for example in Xerox Corp. U.S. Pat. Nos. 5,547,178 and 5,316,279, and in various commercial printer products. Accordingly, the generation, content and use of banner sheets per se need not be described in detail herein. A banner sheet may typically have automatically printed thereon by system and/or printer controller software a limited amount of printed information about that particular document or print job, such as one or more of the following text items: the print job or document name, printer user's (document transmitter's) name or acronym, printer code name, the host intranet system name, file name, date, the numbers of pages in that document or print job, etc.

In the present system, some or all of the banner sheets generated by the printer are also compatibly printed with color test patterns or patches and used as color test sheets for automatically generating and updating printer color control, as will be described in the example herein. Thus, there are automatically provided dual-mode color test sheets/banner sheets, in which multiple color patches of different colors are printed on otherwise blank areas of each, or selected, banner sheets.

This automatic dual mode banner sheet/color test sheet system can be implemented by relatively minor software changes well within the skill of that art at low cost and without having to otherwise modify the color printer, or interfere with or interrupt normal printing, or require any hardware changes. It can provide color test sheet printing intervals at regular timed intervals, and/or at each machine "cycle-up", or as otherwise directed by the system software. It does not limit, however, the alternative or intermixed printing of conventional banner sheets without colors, or fully dedicated color test sheets which are not banner sheets.

The term "banner sheets" as used herein broadly encompasses various on-line printed cover sheets or other inter-document or inter-print-job separator sheets. Providing the subject dual use of such sheets saves both print paper and printer utilization time, and provides frequent color re-calibration opportunities, with no extra fed sheet requirements, where the printing system is one in which banner sheets are being printed at frequent intervals anyway. As noted, is quite common for shared user printers (even those with mailbox system job separators) to automatically generate and print a banner sheet immediately preceding the first page of each actual document being printed. Thus, banner sheets are being fed, printed, and fed out through the output path of a printer at frequent intervals.

Furthermore, it is common for printers, as described in the above-cited patents, to already provide automatic lateral offsetting of its banner sheets as they stack in the output tray, as compared to the other or actual document sheets, to provide print job separators, and to make the banner sheets readily separable from the actual documents. With the present dual mode sheets system, this makes separation and removal of color test sheets equally easy, in fact, accomplished at the same time by the same steps.

As indicated, with the disclosed dual mode banner sheet and color test sheets system the same banner sheets already being generated and printed in many printers may now also be used to variously print thereon the multiple color test patches for the spectrophotometer analysis by the disclosed or other output color control systems. This dual mode sheet usage system saves substantial amounts of otherwise wasted paper which would otherwise be used for non-image color test sheets which would be separated out and discarded after being outputted by the printer in addition to the banner sheets. Furthermore, this system enables frequent color re-correction inputs with no reduction in printer productivity. That is, normal document printing in a color printer does not have to be relatively frequently interrupted to print extra (non-document imaged) color test sheets to keep each color printer re-calibrated.

As discussed elsewhere herein, relatively frequent color re-calibration of a color printer is desirable, since the colors actually printed on the output can change or drift out of calibration with the intended colors for various known reasons. For example, changes in the selected or loaded print media (differences paper or plastic sheet types, materials, weights, calendering, coating, humidity, etc.), changes in the printer's ambient conditions, changes in image developer materials, aging or wear of printer components, varying interactions of the different colors being printed, etc.

The disclosed embodiment is thus a valuable feature for a practical on-line "real time" color printing color calibration or correction system which regularly measures with a spectrophotometer the actual colors currently being printed on printed sheets being outputted by the printer, as compared to the intended (or selected, or "true") colors of the electronic document images being inputted to the printer for printing.

As used in the patent claims and elsewhere herein unless otherwise specifically indicated, the term "spectrophotometer" may encompass a spectrophotometer, colorimeter, and densitometer, as broadly defined herein. That is, the word "spectrophotometer" is to be given the broadest possible definition and coverage in the claims herein, consistent with the rest of the claims themselves. The definitions or uses of terms vary or differ among various scientists and engineers. However, the following is an attempt to provide some simplified clarifications relating and distinguishing the respective terms "spectrophotometer", "calorimeter", and "densitometer", as they may be used in the specific context of specification examples of providing components for an on-line color printer color correction system, but not as limitations.

A typical "spectrophotometer" measures the reflectance of an illuminated object of interest over many light wavelengths. Typical prior spectrophotometers in this context use 16 or 32 channels measuring from 400 nm to 700 nm or so, to cover the humanly visible color spectra or wavelength range. A typical spectrophotometer gives color information in terms of measured reflectances or transmittances of light, at the different wavelengths of light, from the test surface. (This is to measure more closely to what the human eye would see as a combined image of a broad white light spectra image reflectance, but the spectrophotometer desirably provides distinct electrical signals corresponding to the different levels of reflected light from the respective different illumination wavelength ranges or channels.)

A "colorimeter" normally has three illumination channels, red, green and blue. That is, generally, a "colorimeter" provides its three (red, green and blue or "RGB") values as read by a light sensor or detector receiving reflected light from a color test surface sequentially illuminated with red, green and blue illuminators, such as three different color LED's or three lamps with three different color filters. It may thus be considered different from, or a limited special case of, a "spectrophotometer", in that it provides output color information in the trichometric quantity known as RGB.

Trichometric quantities may be used for representing color in three coordinate space through some type of transformation. Other RGB conversions to "device independent color space" (i.e., RGB converted to conventional L*a*b*) typically use a color conversion "lookup table" system in a known manner. (Examples are provided in patents cited below, and elsewhere.)

A "densitometer" typically has only a single channel, and simply measures the amplitude of light reflectivity over a range of wavelengths, which may be wide or narrow. The output of the densitometer detector is programmed to give the optical density of the sample. A densitometer is basically "color blind". For example, a cyan patch and magenta patch could have the same optical densities as seen by a densitometer, but, of course, are different colors.

A multiple LED's reflectance spectrophotometer, as in the example of the embodiment herein, may be considered to belong to a special case of spectrophotometers. (Others, with different respective illumination sources, can be flashed Xenon lamp spectrophotometers, or QH spectrophotometers.) It is a spectrophotometer programmed to give truer reflectance values by using more than 3 channel measurements (e.g., 10 or more channel measurements), with conversion algorithms. That is in contrast to normal colorimeters, which cannot give true, human eye related, reflectance spectra measurements, because they have insufficient measurements for that (only 3 measurements).

As noted, the type of spectrophotometer in the disclosed embodiment is a spectrophotometer especially suitable for being mounted in the printed sheets output path of a color printer to optically evaluate the output sheets as they move past the spectrophotometer. In particular, to measure a limited number of color test patch samples printed by the printer on actual printed sheet output of the printer during regular or selected printer operation intervals (between normal printing runs or print jobs). These color test sheet printing intervals may be at regular timed intervals, and/or at each machine "cycle-up", or as otherwise directed by the system software.

A low cost and relatively simple yet easily calibrated spectrophotometer, as disclosed in the example below, is highly desirable for such a "colorimetry" function for such an on-line color correction system, since a dedicated spectrophotometer must be provided for each printer. A patent of background interest as to using a type of spectrophotometer at the printed sheets output of a color printer is Xerox Corp. U.S. Pat. No. 5,748,221 issued May 5, 1998 to Vittorio Castelli, et al, filed Nov. 1, 1995 (D/95398).

Also noted are pending Xerox Corp. U.S. application Ser. No. 09/083,202, filed May 22, 1998, now issued as U.S. Pat. No. 6,236,474 on May 22, 2001 by Mark A. Scheuer, et al., entitled "Device Independent Color Controller and Method," U.S. application Ser. No. 09/083,203, filed May 22, 1998 by Lingappa K. Mestha, entitled "Dynamic Device independent Image," now issued as U.S. Pat. No. 6,157,469 on Dec. 5, 2000, U.S. application Ser. No. 09/232,465, filed Jan. 19, 1999, now issued as U.S. Pat. No. 6,344,902 on Feb. 5, 2002 by Martin E. Banton, et al., entitled "Apparatus and Method for Using Feedback and Feedforward in the Generation of Presentation Images In A Distributed Digital Image Processing System," and U.S. application Ser. No. 09/221,996, filed Dec. 29, 1998 by Lingappa K. Mestha, et al., entitled "Color Adjustment Apparatus and Method,".

Another example of a test sheet with color test patches automatically generated by a color printer, for operator use, is shown in Xerox Corp. U.S. Pat. No. 5,604,567 issued Feb. 18, 1997 to Peter H. Dundas, et al.

Color correction and/or color control systems should not be confused with color registration systems or sensors. Those systems are for insuring that colors are correctly printed accurately superposed and/or accurately adjacent to one another, such as by providing positional information for shifting the position of respective color images being printed.

Other background patents which have been cited as to color control or correction systems for printers include Xerox Corp. U.S. Pat. No. 5,963,244 issued Oct. 5, 1999 to L. K. Mestha, et al entitled "Optimal Reconstruction of Tone Reproduction Curve" (using a lookup table and densitometer readings of photoreceptor sample color test patches to control various color printer parameters); and U.S. Pat. No. 5,581,376, issued December 1996 to Harrington; U.S. Pat. No. 5,528,386 issued Jun. 18, 1996 to Rolleston et al.; U.S. Pat. No. 4,275,413 issued Jun. 23, 1981 to Sakamoto et al.; U.S. Pat. No. 4,500,919 issued Feb. 19, 1985 to Schreiber; U.S. Pat. No. 5,416,613 issued May 16, 1995 to Rolleston et al.; U.S. Pat. No. 5,508,826 issued Apr. 16, 1996 to Lloyd et al.; U.S. Pat. No. 5,471,324 issued Nov. 28, 1995 to Rolleston; U.S. Pat. No. 5,491,568 issued Feb. 13, 1996 to Wan; U.S. Pat. No. 5,539,522 issued Jul. 23, 1996 to Yoshida; U.S. Pat. No. 5,483,360 issued Jan. 9, 1996 to Rolleston et al.; U.S. Pat. No. 5,594,557 issued January 1997 to Rolleston et al.; U.S. Pat. No. 2,790,844 issued April 1957 to Neugebauer; U.S. Pat. No. 4,500,919 issued February 1985 to Schreiber; U.S. Pat. No. 5,491,568 issued Feb. 13, 1996 to Wan; U.S. Pat. No. 5,481,380 to Bestmann issued Jan. 2, 1996; U.S. Pat. No. 5,664,072 issued Sep. 2, 1997 to Ueda et al.; and U.S. Pat. No. 5,544,258 issued Aug. 6, 1996 to Levien.

By way of further background on the subject of technology for automatic color correction for color printers or other reproduction apparatus, especially such systems utilizing feedback signals from a colorimeter or spectrophotometer (as noted, those terms may be used interchangeably herein), and/or automatically measuring the actually printed colors of test patches on printed copy sheets as they are being fed through the output path the printer, there is noted the following: the above-cited Xerox Corporation U.S. Pat. No. 5,748,221 filed Nov. 1, 1995 and issued May 5, 1998 to V.

Castelli, et al; entitled "Apparatus for Colorimetry, Gloss and Registration Feedback in a Color Printing Machine", (noting especially the output path test print calorimeter detector details); the above-cited Apple Computer, Inc. U.S. Pat. No. 5,612,902, issued Mar. 18, 1997 to Michael Stokes; Xerox Corporation U.S. Pat. No. 5,510,896 issued Apr. 23, 1996 to Walter Wafler, filed Jun. 18, 1993 (see especially Col. 8 re color calibration from information from a scanned color test copy sheet as compared to original color image information); and Xerox Corporation U.S. Pat. No. 5,884,118 issued Mar. 16, 1999 to Mantell and L. K. Mestha, et al, entitled "Printer Having Print Output Linked to Scanner Input for Automated Image Quality Adjustment" (note especially Col. 6 lines 45–49).

U.S. Patents of interest to color correction in general, but which may be useful with, or provide background information for, the above or other systems, includes the above-cited Xerox Corporation U.S. Pat. No. 5,594,557, filed Oct. 3, 1994 and issued Jan. 14, 1997 to R. J. Rolleston et al., entitled "Color Printer Calibration Correcting for Local Printer Non-Linearities"; Seiko Epson Corp. U.S. Pat. No. 5,809,213, provisionally filed Feb. 23, 1996 and issued Sep. 15, 1998 to A. K. Bhattacharjya re reduced color measurement samples; and Splash Technology, Inc. U.S. Pat. No. 5,760,913 filed Feb. 12, 1996 and issued Jun. 2, 1998 to Richard A. Falk in which a calibration image is scanned using a scanner coupled to the printing system with a personal computer.

Also noted are pending Xerox Corp. U.S. applications Ser. No. 09/083,202 filed May 22, 1998 by Mark A. Scheuer, et al., entitled "Device Independent Color Controller and Method" Ser. No. 09/232,465, filed Jan. 19, 1999 by Martin E. Banton, et al., entitled "Apparatus and Method for Using Feedback and Feedforward in the Generation of Presentation Images In A Distributed Digital Image Processing System", and Ser. No. 09/221,996, filed Dec. 29, 1998 by Lingappa K. Mestha, et al., entitled "Color Adjustment Apparatus and Method", and U.S. Pat. No. 6,157,409.

As further well-known background for the reader on the subject of difficulties in color correction of printers in general, computers and other electronic equipment generating and inputting color images or documents typically generate three-dimensional or RGB (red, green, blue) color signals. Many printers, however, can receive four-dimensional or CMYK (cyan, magenta, yellow, and black) signals as input, and/or can print with four such print colors (although the printed images can be measured as corresponding RGB values). A look-up table is commonly provided to convert each digital RGB color signal value to a corresponding digital CMYK value before or after being received by the printer. Another difficulty is that a theoretical printer which had ideal toner, ink or dye printing materials colors and printing behavior would have a one-to-one correspondence of cyan-to-red, magenta-to-green, and yellow-to-blue. This would mean that when printed, the cyan ink would only absorb red light, the magenta ink would only absorb green light, and the yellow ink would only absorb blue light. However, real-world printers inherently have non-ideal printing materials colors and behaviors, and therefore have complex non-linear calorimetric responses. Also, interactions between the cyan, magenta, and yellow imaging materials exist, especially on the printed output, which result in unwanted or unintended absorptions of colors. Even after a printer is initially calibrated, such that one or a range of input digital CMYK values produce the proper color(s), the full spectrum of CMYK values and printed colors is not accurate. In other words, the colors asked or directed to be printed are not the same as the actual colors printed.

This discrepancy arises in part because the relationship between the digital input values that drive the printer and the resulting colorimetric response is a complex non-linear function. Labeling the response, or other values, as "colorimetric" can indicate that the response or value has been measured by such an instrument. Adequately modeling the colorimetric response of a printer to achieve linearity across the entire available spectrum requires many parameters. Typically, a color correction look-up table is built which approximates the mapping between RGB colorimetric space and CMYK values, as taught in various of the above-cited references. Each RGB coordinate may be typically represented by an 8-bit red value, an 8-bit green value, and an 8-bit blue value. Although those RGB coordinates are capable of addressing a look-up table having $256^3$ locations, measuring and storing $256^3$ values is expensive. The look-up table is thus typically partitioned into a smaller size such as 16×16×16 (4096) table locations, each of which stores a four-dimensional CMYK value. Other CMYK values may then be found by interpolating the known CMYK values using an interpolation process, for example, trilinear or tetrahedral interpolation.

The color correction look-up table may be built by sending a set of CMYK digital values to the printer, measuring the colorimetric RGB values of the resulting color patches outputted by the printer, and generating the look-up table from the difference between the inputted values and the measured outputted values. More specifically, the color correction look-up table corrects for non-linearities, printing parameter variations, and unwanted absorptions of inks, so that the printer will print the true corresponding color.

After the color correction table is generated, the actual printer response tends to drift over time. To correct for the drift, the system is adjusted or recalibrated periodically. Recalibrating the color correction table involves periodically printing and remeasuring a set of test color patches which are then compared to an original set of color patches by calibration software. Remeasuring, however, has heretofore more typically been performed by a scanner or other measuring device which is remote from the printer being recalibrated. In that case, an operator must manually reconfigure the scanner and calibration software to properly recognize and measure the test color patches. This assumes that the operator can properly identify the test color patches being tested in accordance with the original printer and its test pattern properties. Furthermore, once a color correction table is generated, it must be associated with the correct printer, otherwise, a different printer will be recalibrated with an incorrect correction table. The above-cited references on automatic, on-line, color correction note the important advantages of being able to provide direct output color measurements for each printer.

SUMMARY OF THE INVENTION

The present invention thus also provides for a new and improved system and method of assisting in the frequent rer-calibrating of a color printer and/or refining color correction tables which overcomes various above-referenced and other problems, although not limited thereto.

For maintaining high quality color reprographics, it is highly advantageous to frequently monitor system calorimetric performance on-line through the use of an integrated spectrophotometer. That is, to have the printing device frequently automatically generate calibration prints on otherwise normally printed sheets with color patches based on digital test pattern generations, and to have an on-line spectrophotometer in the printer output read those moving printed color test patches to provide printed output color measurement signals. This requires fairly frequent test sheet printing and a spectrophotometer capable of effectively operating in that environment and under those conditions to read those test sheets accurately, which are not typical for conventional laboratory spectrophotometers. That is provided by the spectrophotometer disclosed herein, but the subject system is not limited thereto.

A specific feature of the specific embodiment disclosed herein is to provide in a color printer for printing multiple print jobs comprising sequentially printed color sheets, said color printer having a banner sheet printihg system for automatically printing banner sheets preceding respective said print jobs, said banner sheets having printed thereon identifying information relating to said print jobs, and said color printer having an output path for outputting said printed color sheets in a process direction, the improvement in said color printer comprising: a printed colors measurement system, said printed colors measurement system including a spectrophotometer mounted in said output path and a color test prints generation system for periodically printing multiple different color test patches on special said printed color sheets being printed and outputted through said output path as printed color test sheets, said spectrophotometer being adapted to sense said different colors printed on said color test patches on said printed color test sheets in said output path, wherein at least a plurality of said printed color test sheets printed by said color printer with said multiple different color test patches are dual mode sheets comprising said banner sheets printed by said banner sheet printing system with said identifying information printed thereon relating to said print jobs wherein said banner sheet printing system and said color test prints generation system are coordinated so that said banner sheet printed identifying information and said multiple different color test patches are printed in different areas of said dual mode sheets so as to not overprint one another.

Further specific features disclosed herein, individually or in combination, include those wherein said multiple different color test patches are printed in a limited area of said dual mode sheets extending across said dual mode sheet in said process direction and said banner sheet printed identifying information is printed on said dual mode sheets outside of said limited area; and/or wherein said color test prints generation system is further adapted to generate a dual mode color test print and banner sheet printed with at least one color test patch corresponding to a color to be printed in said print job for which said dual mode sheet is said banner sheet; and/or a method of color printing in a color printer which automatically prints and outputs printed sheets through an output path in a process direction, including printed sheets which are banner sheets printed with banner sheet information relating to a subsequently printed print job, which color printer is provided with a color measurement system for measuring printed colors on printed sheets in said output path, comprising: automatically printing an array of multiple color test patches for said color measurement system on a multiplicity of said automatically printed banner sheets, said array of multiple color test patches being printed in an area of said banner sheet extending across said banner sheet in said process direction, and said printed banner sheet information being printed on said banner sheet outside of said area of said banner sheet in which said array of multiple colored test patches is printed; and/or wherein at least part of said subsequently printed print job is to be printed with at least one specific color, further comprising printing on said banner sheet for said print job at least one color test patch corresponding to said specific color to be printed in said subsequently printed print job.

The disclosed system may be connected, operated and controlled by appropriate operation of conventional control systems. It is well known and preferable to program and execute various control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software and computer arts. Alternatively, the disclosed control system or method may be implemented partially or fully in hardware, using standard logic circuits or single chip VLSI designs.

In the description herein the term "sheet" refers to a usually flimsy physical sheet of paper, plastic, or other suitable physical substrate for images, whether precut or web fed. A "copy sheet" may be abbreviated as a "copy", or called a "hardcopy" As will be noted, printed sheets may be referred to as "output". A "print job" is normally a set of related printed sheets, usually one or more collated copy sets copied from a one or more original document sheets or electronic document page images, from a particular user, or otherwise related.

As to specific components of the subject apparatus, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background. What is well known to those skilled in the art need not be described here.

Various of the above-mentioned and further features and advantages will be apparent from the specific apparatus and its operation described in the example below, and the claims. Thus, the present invention will be better understood from this description of a specific embodiment, including the drawing figures (approximately to scale, except for schematics).

Figure 4:
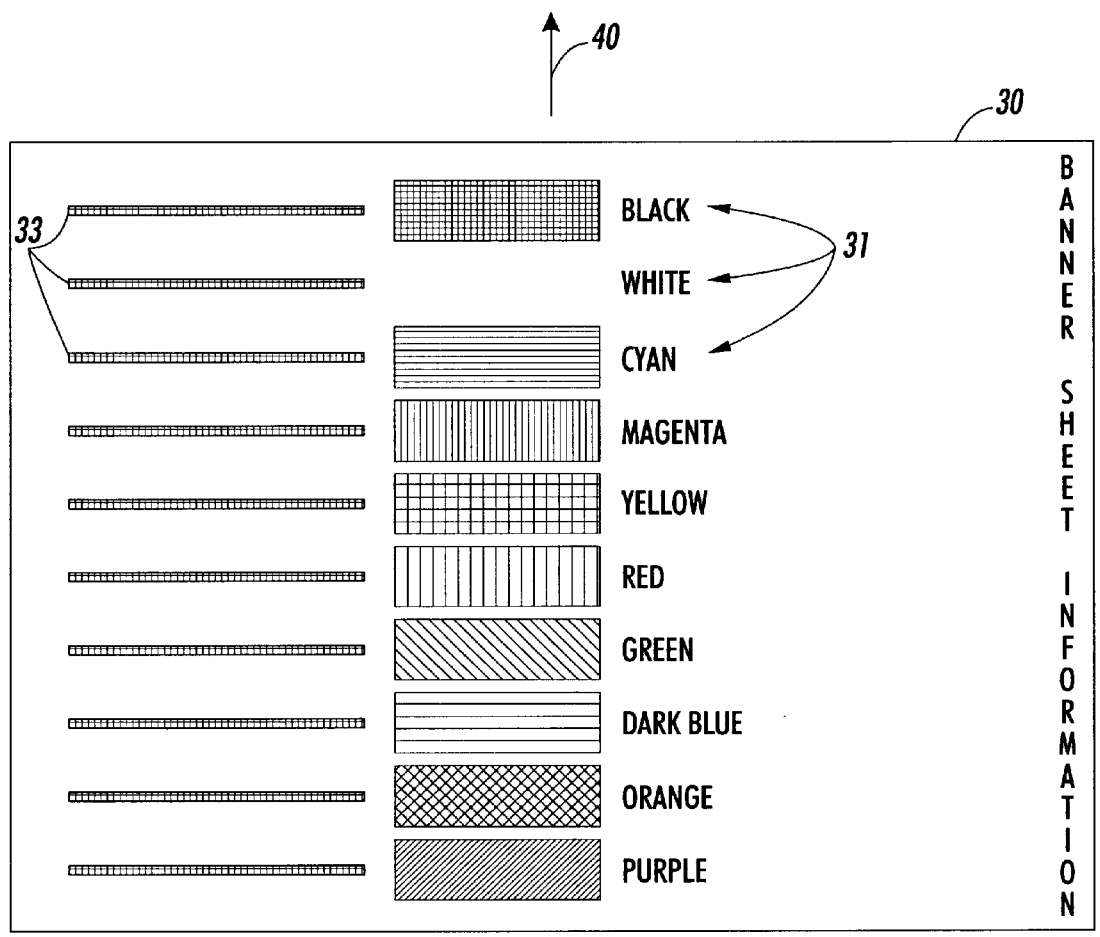
FIG. 4 shows one example of a dual mode banner sheet and color test sheet in accordance with the present invention, printed by a color printer with plural color test patches to be read by the spectrophotometer of FIGS. 1 and 2, but also printed with "Banner Sheet Information" in another area of the same sheet.

It will be appreciated that different colors are represented in the Figures., especially in FIG. 4, by their standard U.S. Patent Office black and white cross-hatching symbols.

DESCRIPTION OF THE PREFERRED EMBODIMENTS

Describing now in further detail the exemplary embodiments with reference to the Figures., there is shown an automatic color sensing system 10 with a spectrophotometer 12. The spectrophotometer 12 may be utilized with circuitry such as that of FIG. 3, or otherwise, to accurately multiply read plural different color test patches such as 31 printed on moving color test sheets 30 such as that shown in FIG. 4. The test sheets 30 may be conventionally printed on conventional copy sheet paper by a conventional color printer or printing system 20 (exemplified in FIG. 5). The disclosed spectrophotometer 12 can accurately read the colors of the test patches 31 even though the test sheets 30 are non-planar and/or variably spaced from the spectrophotometer 12 during their color measurements. Thus, the measurements are not affected by normal variations in sheet surface positions in a normal paper path of a printer. This allows the simple mounting of the spectrophotometer 12 at one side of the normal printed sheets output path 40 of the printer 20 (or various other color reproduction systems).

Figure 5:
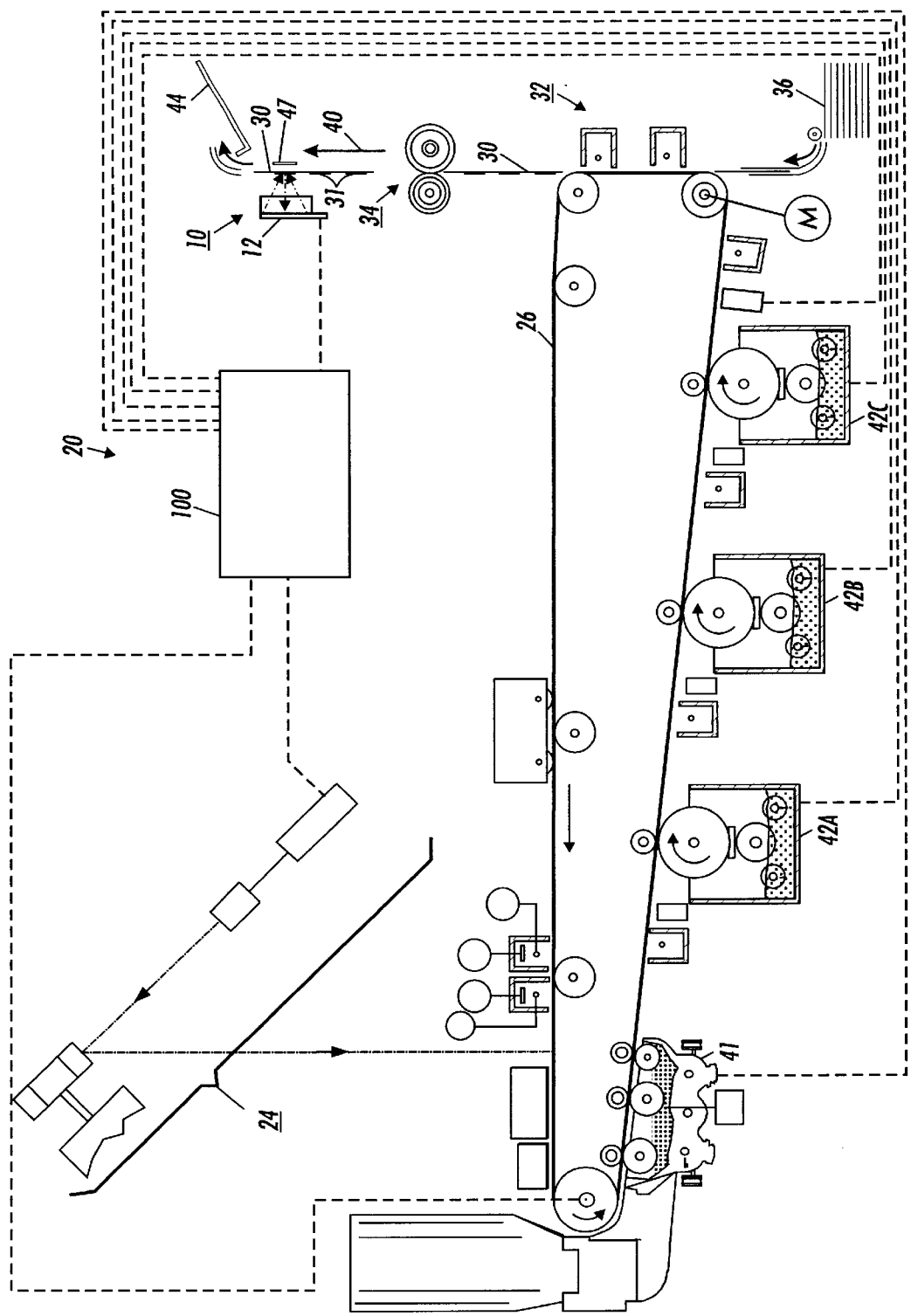
FIG. 5 schematically shows one example of an otherwise conventional color printer printing the dual mode banner and color test sheets of FIG. 4 and sequentially reading the color patchs on those test sheets while the test sheets are moving in their normal output path near the output of with the spectrophotometer of FIGS. 1 and 2, which is shown here mounted at one side of that sheet output path opposite from an opposing calibration test surface.

Describing first the exemplary color printer 20 of FIG. 5 here in more detail, it is schematically illustrating a conventional xerographic laser color printer, details of various of which will be well known to those skilled in that art and need not be re-described in detail herein.

As previously described, this is a color printer of a known type which automatically prints "banner sheets" as separator or header sheets for the documents being printed. Those products and the banner sheets patents cited above, and others, and the description above, provide sufficient explanation of the automatic generation and typical printed content or text of banner sheets such that a detailed re-explanation thereof is not required.

That same basic banner sheet generation software can still be used in the present system, except that the banner printed text location may need to be slightly modified as to the location of the printing of that data on the dual mode sheet 30. As noted, such typically printed banner sheet information can be one or more of the user's name, the document title, the date and time, or the like. In the present system, this printing of banner sheet information is coordinated with the known or other systems and software for the generation and printing of the color test patches such that these two different sets of images do not overprint on top of one another. As shown in FIG. 4, this may be accomplished by printing all the banner sheet information along one side area of the printed sheet 30, whereas all of the multiple color test patches 31, and any other test indicia such as the associated cursor indicia 33, are printed elsewhere on the sheet 30.

As shown in FIG. 4, it is desirable for all the banner sheet information on the dual mode sheet 30 to all be printed in a relatively narrow area of the sheet 30 extending in the direction of movement of the sheet 40 through the output path 40, which direction is referred to in the art as the process direction. Thus, the entire dimension of the sheet 30 in the process direction on the other side of the sheet 30 is unobstructed, and is thus available for printing of a complete band of (the maximum number of) color test patches in the process direction, as shown. The color test patches 31 need, of course, to be generally aligned on the sheet 30 in this movement direction of all the sheets in the output path 40 in order to all be in the same lateral position in the sheet path relative to the fixed field of view of the photodetector D12 and its lens system 13.

To express it another way, all the multiple different color test patches 31 are printed in a limited area of the dual mode sheet 30 extending across the sheet in the process direction (the sheet movement direction), while all of the banner sheet print job identifying information is printed on the sheet 30 outside of that limited area, thereby allowing the line of test patches 31 to be printed across the entire sheet, maximizing the number of test patches 31 which can be printed on each dual mode sheet 30, yet still leaving ample printing room on the same sheet for the banner sheet information printing.

Thus, as shown in FIG. 4, the sheets 30 may be dual mode sheets providing for frequently printed color test sheets having the same amount of available space for the same number of color test patches as a blank sheet, but also still serving equally as effectively as the banner sheets heretofore printed on blank sheets, capable of providing the same banner sheet functions of print job separations and print job identifications with typical banner sheet printed information.

This dual mode combined banner and color test sheets system can thus be provided without hardware changes with a combination of: (a) existing (or minor modifications of the) software for feeding, generating and printing the banner sheets, such as condensing and/or moving the location of the banner information printed on the banner sheets, with (b) existing (or minor modifications of the) software for generating and printing color test sheets with multiple test patches of different colors.

Banner sheets are normally printed at more than frequent enough intervals to provide for very frequent automatic re-calibration test sheets to frequently update the color printing electronic image information and/or color printing sub-systems. Thus, not every banner sheet needs to be a dual mode sheet with color test patches. In fact, for the normal situation of relatively few document or print job pages per banner sheet in a shared user printer environment, it may be desirable to reduce color toner usage by only using those banner sheets as color test sheets which occur at more than a preset time interval apart. It may also be desirable to only provide color test patterns on those banner sheets which are the banner sheets for a document which is being color printed, not the banner sheets for black and white documents, except perhaps at cycle-up or after a long time delay.

It will also be appreciated that different sets of colors may be printed on different banner sheets. Thus, an additional feature which can be provided with this system is to tailor or set the particular colors of the test patches on a particular banner sheet to those colors which are about to be printed on the specific document for that banner sheet, i.e., the document pages which are printed immediately subsequent to that banner sheet (the print job identified by that banner sheet). This can provide a "real time" complete closed loop color correction for the color printer which is tailored to correct printing of the colors of the very next document to be printed just before it is printed, and/or to generate a new or updated particularly accurate color print table for the particular colors to be printed in the associated document by test patches printed on the banner sheet for that particular color or colors. E.g., the particular color specified for a logo, trademark, or letterhead for a particular company, such as the "Xerox"® red "X", "IBM"® blue, etc.

The preferred implementations of the systems and features disclosed herein may vary depending on the situation. Also, various of the disclosed features or components may be alternatively used for such functions as gray scale balancing with gray test patches, turning on more than one of the illumination sources at once, such as oppositely positioned LED's, etc.

However, in using dual mode color test banner sheets, or other color test sheets, in the specifically disclosed on-line printer system, it will be appreciated that the color test patches on the sheets should be compatible with the performance metrics of the spectrophotometer or other color sensor being used, and the color test patches are printed on the sheet in locations within the sensor's field of view as the sheet is fed past the sensor's field of view.

It will also be appreciated that these test patch images and colors may be automatically sent to the printer imager from a stored data file specifically designed for printing the dual mode banner sheet or other color test sheet page, and/or they may be embedded inside the customer job containing the banner page. That is, the latter may be directly electronically associated with the electronic document to be printed, and/or generated or transmitted by the document author or sender.

After the spectrophotometer or other color sensor reads the colors of the test patches, the measured colors may be processed inside the system controller or the printer controller to produce or modify the tone reproduction curve. The color test patches on the next banner page, and the customer document pages of the next print job may then be printed with that new tone reproduction curve. This process may be continuously repeated for each subsequent print job and its banner page so as to generate new or further corrected tone reproduction curves from each subsequent banner page. If the printer's color image printing components and materials are relatively stable, with only relatively long term drift, the tone reproduction curve produced by measuring colors off the normal single banner page for each print job, and using this closed loop control system, will be the right curve for achieving consistent colors for at least one or even a substantial number of customer print jobs printed thereafter.

However, If there are substantial changes in the print media being used by the printer, or other sudden and major disturbances in the printed colors (which can be detected by the spectrophotometer output in response to the test patches on the next dual mode banner sheet or other color test sheet) then the subsequent customer print job may have incorrect color reproduction. In these situations of customer print media changes in the printer (or new print jobs or job tickets that specify a change in print media for that print job), where that print media change is such that it may substantially affect the accuracy of the printed colors for that subsequent print job, it is not desirable to continue printing and then have to discard the next subsequent print jobs printed with customer-unacceptable colors. In that situation it is preferable to interrupt the normal printing sequence once the sudden color printing disturbance is detected and to instead print plural additional color test sheets in immediate succession, with different color test patch colors, to sense and converge on a new tone reproduction curve that will achieve consistent color printing for that new print media, and only then to resume the normal printing sequence of customer print jobs. Thus, the subsequent customer print jobs would then use the final, re-stabilized, tone reproduction curve obtained after such a predetermined number of sequential plural color test sheets or dual mode banner pages have been printed.

However, this patent application is not related to or limited to any particular one of the various possible (see, e.g., various of the cited references) algorithms or mathematical techniques for processing the electronic signals from the spectrophotometer to generate color correction tables, tone reproduction curves or other color controls, and hence those need not be further discussed herein.

Examples of further descriptions of the otherwise conventional features of the exemplary color printer 20 of FIG. 5 are in the above-cited Xerox Corp. U.S. Pat. No. 5,748, 221, etc., and other art cited therein. A photoreceptor belt 26 is driven by a motor M and laser latent imaged or exposed by a ROS polygon scanning system 24 after charging. The respective images are developed by a black toner image developer station 41 and/or one or more of three different color toner image developer stations 42A, 42B, 42C. The toner images are transferred at a transfer station 32 to sheets of copy paper fed from an input tray stack 36. Where one or more test sheets 30 are being printed instead of normal document images (at times, and with color tests, selected by the controller 100), each such test sheet 30 may be fed from the same or another sheet supply stack 36 and its test images transferred in the normal manner. The test sheet 30 is then outputted through fuser 34 to the same normal output path 40, as if it were any other normal sheet being normally color printed.

However, here, a spectrophotometer 12 is mounted at one side of that output path 40 (or, in the output tray 44) to regularly sense the actual, fused, final colors being printed, providing the input for the on-line color sensing system 10, with controller 100 and/or interactive circuitry and/or software. The controller 100, and sheet sensors along the machine 20 paper path, conventionally control the feeding and tracking of sheet positions within the printer paper path. The controller 100 and/or a conventional sensor for fiduciary marks 33 or the like on each test sheet 30 can provide control or actuation signals to the spectrophotometer 12 circuitry for the spectrophotometer 12 to sequentially test or read the colors of each of the test patches 31 on the test sheet 30 as that test sheet 30 moves past the spectrophotometer 12 in the output path 40, as will be further described. The test patches 31 can be variously located and configured, as blocks, strips, or otherwise, of various digitally selected solid color images.

Thus, in the disclosed embodiment, plural test sheets 30 of paper or other image substrate material being printed by the color printer 20 can be automatically printed with pre-programmed plural test patches 31 of defined colors, preferably with associated simple fiduciary marks for signaling the reading location of each colored test patch on the test sheet. Each test sheet moves normally past the subject compact, fixed position, spectrophotometer 12 which is unobstructedly mounted at one side of the normal post-fuser machine output path 40 to both illuminate and view sheets passing thereby, in contrast to those prior systems requiring removing and holding a test sheet still, and moving a standard colorimeter over the test sheet.

It will be seen that the spectrophotometer 12 here, although compact, has 10 different color sampling illumination sources, provided by 10 circularly mounted and sequentially operated LED's, D1 through D10, each with different color filters, such as 16 and 17, but each having the same simple condenser lens such as 18 and 19 for directing the respective LED's output uniformly onto the same target area, as especially shown in FIGS. 1 and 2, and further described below with reference to FIG. 3. The normal target area in the system 10 embodiment herein, of course, is a color test patch 31. As particularly shown in FIG. 2, that illumination by any one of the LED's provides various levels of light reflected from that target (depending on the respective colors of both the test patch and the selected illumination source) which is collected by the single central lens 13, and focused by that lens 13 onto, and around (by overfill) a single photosensor D12. FIG. 2 illustrates with dashed line light rays both the LED illumination and the focusing by a projection lens 13 (a simple two-element lens in this example 13) of three exemplary target points A, B and C onto the focal plane of lens 13 as C', B' and A', of which B is in the center of the target, and has its image point is in the center of the photosensor D12, while A and B are outside the test patch 31 area and image as B' and A' outside the (small fixed) area of the photosensor D12.

Figure 1:
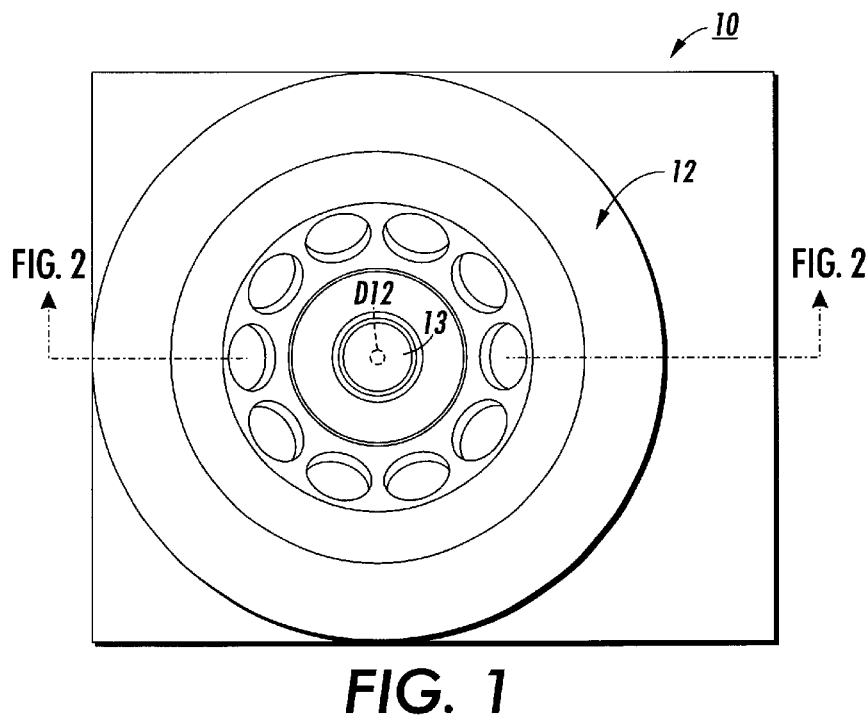
FIG. 1 is a top view of one example or embodiment of a spectrophotometer which may be utilized with the disclosed printing color correction system example.
Figure 2:
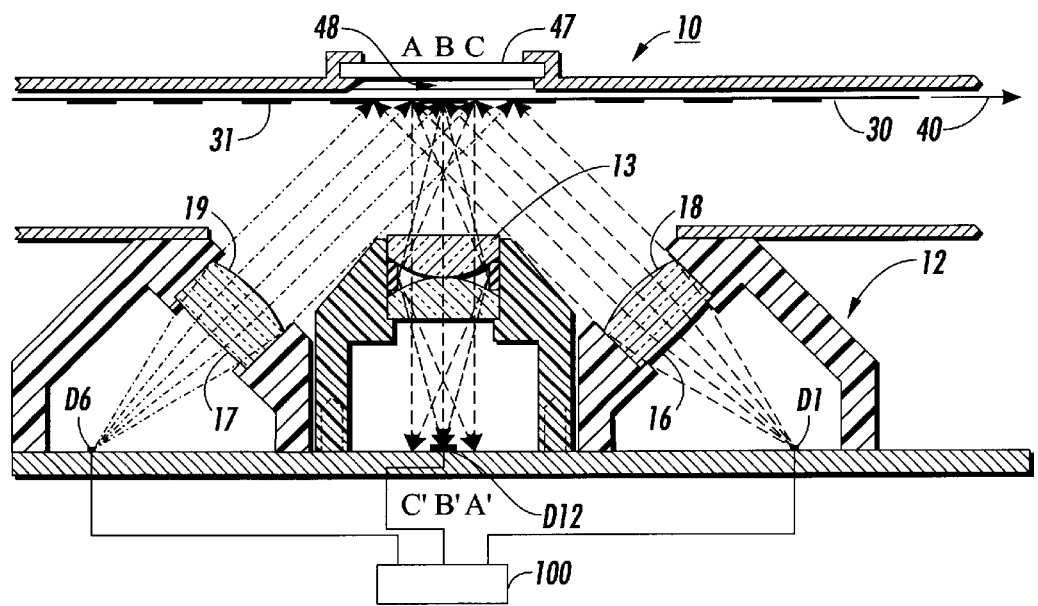
FIG. 2 is a cross-sectional view taken along the line 2—2 of the spectrophotometer of FIG. 1 shown measuring the color of a test patch of a test sheet moving in the printer output path.

Although conventional glass or plastic lenses are illustrated in FIGS. 1 and 2 here, it will be appreciated that fiber optics or selfloc lenses could be utilized instead. Fiber optics may be used to conduct the illumination from the LED's. Also, a collecting fiber optic may be used if it is desired, for example, to space the detecting photosensor D12 remotely from the focal plane of the lens 13.

As utilized in this disclosed embodiment of an on-line color sensing system 10, this low cost multi-element spectrophotometer 12, as mounted in the printer 20 copy sheet output path 40, can thus be part of a color correction system to automatically control and drive to color printing accuracy the printer 20 CMYK color generation with a considerably smaller number of printed test sheets 30. The color correction system can sequentially look at a relatively small series of color test patterns printed on copy sheets as they are outputted. One or more mathematical techniques for color error correction with multiple spectrophotometer-detected output color signals for each color patch as input signals can provide for a greatly reduced number of required printed test patches for a calibration or re-calibration of a printer. For example, about 100–200 test patches, or only 4 to 8 test sheets of about 25 color patches per sheet, versus approximately 1000 test patches or 40 test sheets for a traditional machine color mapping, with a spectrophotometer 12 with approximately 10 different color sampling illumination sources. As noted, and as shown in FIG. 4, the test sheets here are desirably the banner sheets which printers automatically produce for separating print jobs anyway, with color test patterns additionally printed thereon. This reduces or eliminates printer interruptions of normal color printing for color test sheet printing. However, additional non-banner color test sheets can desirably be printed upon "cycle up" of the printer (restarting of the printer) before any color documents are printed.

An accurate color control system, as disclosed herein, can thus provide regularly for testing and storing current machine color printing responses to color printing input signals (an up-to-date model) for remapping LAB (or XYZ) "device independent" color inputs (for later conversion to device dependent RGB or CMYK color space for printing). That information can also be profiled into a system or network server for each different machine (and/or displayed on a CRT controller for color manipulation).

Turning now to the structure of the exemplary spectrophotometer 12 shown in FIGS. 1 and 2, there is disclosed a small, compact, simple, easily made, and low cost spectrophotometer optically designed insensitive to the separation between the sensing head and the object under interrogation, such as a color test patch 31. As noted, a particular benefit of this feature is the ability of this spectrophotometer 12 to dynamically measure images on paper in the transport path of a reprographic machine without stopping or unduly constraining the paper to a narrow nip or between closely confining baffles for that measurement, thereby allowing the use of the existing or conventional paper path, not requiring any additional UMC, and not creating the possibility of increased paper jams by a confined or restrictive portion of the paper path.

A major challenge in color reprographics machines is the production of images that are identical in appearance to the "original", whether this original is an electronic image of a hard copy image scanned on the platen of a scanner or digital copier, or a stream of color encoded digital information from a PC or terminal, network, tape, magnetic disk, etc. With monochrome, i.e., black on white, copiers or printers it has been possible to perform adequate output prints appearance-matching through control of the individual marking process elements with sensors and connecting feedback control systems internal of the machine. These have included electrostatic voltmeters, densitometers, and toner concentration sensors, among others. Especially, by the measurement of developed toner test patches on the photoreceptor. The human eye is relatively insensitive to variations in the image density of black on white images. However, with color images, the eye is far more sensitive to image fidelity, which manifests itself not just unidimensionally in lightness/darkness, but three dimensionally in hue, saturation, and lightness. In order to produce or correct the highest quality of reproduction of xerographic and other color images, it has become recognized that it may be necessary to position a spectrophotometer in the output paper path, post fusing, so as to measure the relative reflectance of developed and fused color test patches, so as to enable more complete corrections to be made to the color processing of the printer and/or to the color image data, in order to enable or maintain good color reproduction of completed prints.

In order to be compatible with industry standards set forth by the CIE, and to avoid picking up gloss in the color measurements, the test patch illuminations for color measurements should be at 45 degrees to the surface of the media on which the color test patch is printed. Also for that standard, the color test patch measurements should be performed using flux diffusely scattered from the (so-illuminated) test patch at 90 degrees (perpendicular) to that color test patch surface. As may be seen, this is provided by the spectrophotometer 12.

A significant challenge to overcome in implementing an output spectrophotometer in a reprographic machine is the repeatable collection of the reflected flux, as the amount of flux collected is proportional to the solid angle subtended by the entrance pupil of the flux collection optics, which is the lens system 13 here.

Prior spectrophotometers, calorimeters, and densitometers typically required that the measured target be held in a fixed predetermined position during measurement, typically accomplished by physically pressing the target material flat against a reference surface attached or held closely adjacent to the device's sense head. In contrast, the position of print media in existing printer paper paths, in the direction perpendicular to the paper path plane, is relatively uncontrolled in much of the paper path, since the paper normally is moved in between baffles which are much more widely spaced apart than the paper thickness, preferably by several millimeters, as illustrated here in FIGS. 2 and 6. The paper may even be deliberately corrugated by corrugating feed rollers.

One solution would be to mechanically constrain the media in the measurement nip by means of additional apparatus in the paper path. However, as noted above, this is highly undesirable because of the increased cost associated with additional components, and the probable increase in jams due to the required constriction in the paper path.

The solution in this example is to instead provide a novel spectrophotometer 12 which is relatively insensitive to the relative displacement between the spectrophotometer and the color target media it is measuring. This is far more desirable, as it minimizes interference with the media, allows architectural versatility in the placement of the sensor, and, if done correctly, need add only a small increment in sensor UMC. There is provided here a spectrophotometer 12 whose output is relatively insensitive to the displacement from the surface of the media under interrogation, yet which is compact and relatively inexpensive and thus suitable for cost-effective deployment in the regular (and unrestricted) output paper paths of conventional reprographic machines.

As otherwise described herein, in the spectrophotometer 12 of FIG. 2 flux from a selected light source D1 (the one being illuminated at that time) is shown being collimated by a condensing lens 18 and applied to a test patch 31 on the print media 30. An inverted image of the illuminated area is formed at the detector D12 plane by a projection optic 13, which overfills the area of the detector D12. By selecting the magnification of that optic 13 to be 1:1, it has been discovered that, to the first order, the energy density in the image detected by the detector will be invariant to the spacing between the media and the sense head, as will be explained. Light energy from the test patch 31 collected by the optics 13 is proportional to the solid angle subtended by the projection lens 18. Mathematically, as a media to optic displacement r varies, the total energy in the image varies by the solid angle, which is proportional to r-2. Variation in the media to sensor spacing also affects the image size in a corresponding manner. For 1:1 imaging optics, magnification varies as the inverse of the displacement, r-1, which produces a change in the image area proportional to r-2. Thus the image energy density, i.e. energy per unit area, becomes invariant to first order with displacement. Since the detector samples a fixed area within the image, to the first order its output is thereby made invariant with spacing.

To express this another way, with a collection lens for the photosensitive detector D12 with a one to one magnification, a fixed exposed area of the photosensitive detector D12 will effectively get almost the same number of microvolts of energy per square millimeter from an illuminated target aria even if the target area varies in distance therefrom by as much as plus or minus three millimeters. Or, in this example, a test sheet surface displacement or freedom of movement in the paper path of plus or minus three millimeters.

To provide a further explanation mathematically, assume:
At image and object conjugates of 2 f, that the system magnification is 1:1

For small variations in media displacement, "d", image area ~(2 f+d)^-2
Total energy in the image ~(R+d)^-2
Image energy density (image energy÷image area) is thus made independent of "d" for a magnification of 1:1.

A 1:1 magnification is thus the best operating point for the detector optics. While 1:1 is preferred, it is projected that a range of 0.9:1 to 1.1:1, or approximately 1:1, may be usable in some situations. By "approximately" 1:1 magnification of the lens 13 (the lens for the fixed area of the light receptive portion of the photosensor D12), it is meant here that first order accuracy in the light intensity on the photosensor, and thus first order accuracy in its output signal can also be obtained for a limited range above or below 1:1. That range would still allow a variation in target spacing from the spectrophotometer 12 of at least + or − approximately 2.5–3 mm within said first order color reflectance measurement accuracy, thus allowing approximately 6 mm or more of spacing, for normal spacing between the defining or confining opposing baffles of the paper path at that point.

Thus, this lens system for transmitting the illumination from the test patch to the photodetector sensor provides effective displacement insensitivity in the electrical signals provided by that photodetector sensor for variations in displacement between the test patch and the spectrophotometer of up to at least 6 millimeters. That allows a corresponding amount of lateral displacement freedom of movement tolerance (and opposing baffles spacing), and/or sheet curl or cockle tolerance, to be provided for all of the printed sheets, including the test sheets, in the output path of said color printer. That is, the test sheets do not have to be pressed against, or closely confined against, the spectrophotometer, and the printer output path does not have to be modified in that respect.

The presently preferred focal length of the lens system 13 at this point in time is about 32 mm. That appears to be a good tradeoff point between the amount of light energy desirably collected at the sensor and the achievement of displacement insensitivity in a reasonably sized spectrophotometer package. Different focal length lenses can be used, but the overall conjugate (the distance between the test patch and its image) would need to grow correspondingly to maintain the same displacement insensitive behavior.

The concept is implimentable with various technologies or conventional components, including a on-board hybrid chip, which is preferred, especially to provide a single on-board chip or board for a multiple LED spectrophotometer as shown. In that architecture, an appropriate selection of LED die with different wavelengths covering the visible spectrum may be formed in a circular pattern on a PWB. As will be further described with reference to FIG. 3, each LED may be lit in sequence. As shown in FIG. 2, the flux from each LED is collimated and centrally directed to be applied to the same test patch under the center of the spectrophotometer 12. That position is also on the center axis of the lens 13, which lens 13 is located in the center of the ring or circle of LED's, as clearly seen in FIG. 1. This enables a 1:1 image of the illuminated patch to be projected onto a single detector D12 on that same central axis. By recording the detector D12 outputs when a test patch is successively illuminated by each individual LED, the reflectance of the test patch as a function of different wavelengths can be determined, and with ten or more different LED output wavelengths as in this spectrophotometer 12 example, that reflectance of the test patch as a function of different wavelengths can be extrapolated or interpolated over the entire visible spectra.

Irrespective of the printer architecture, measurements need to be made in real time as the media passes across and through the spectrophotometer 12 sensing nip. It is anticipated that the preferred test patch size for the spectrophotometer 12 will be around 12 to 20 mm and that the measurement thereof may take about 20 milliseconds.

Figure 3:
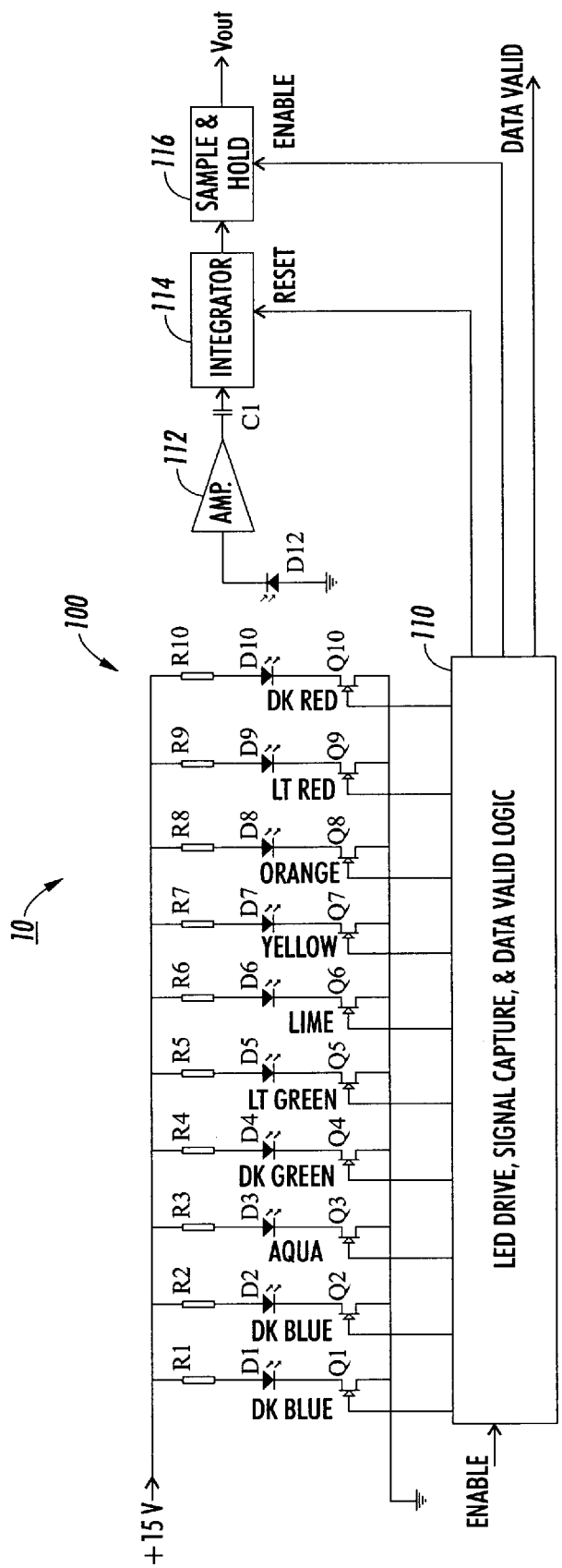
FIG. 3 schematically shows of one example of circuitry with which the exemplary spectrophotometer of FIGS. 1 and 2 may be operated.

FIG. 3 is a schematic or block diagram of exemplary LED driver and signal processing circuits of the LED spectrophotometer 12 of FIGS. 1 and 2, generally identified here for convenience as part of the controller 100, even though it can be, in whole or in part, a separate circuit, desirably having a single driver chip or die for all of the LED's in the spectrophotometer itself. In response to regular timing signals from the circuit 110 labeled "LED Drive, Signal Capture, & Data Valid Logic" here, each LED is pulsed in turn by briefly turning on its respective transistor driver Q1 through Q10, by which the respective LED's D1 through D10 are turned on by current from the indicated common voltage supply through respective resistors R1 through R10. Ten different exemplary filtered light output colors or wavelengths of the ten respective LED's D1 through D10 are indicated in this FIG. 3 by the legends next to each of those LED's. Thus, each LED is sequenced one at a time to sequentially transmit light though its respective differently colored filter, such as filter 16 shown in FIG. 2.

While the LED's in this example are turned on one at time in sequence, it will be appreciated that the system is not limited thereto. There may be measurement modes in which it is desirable to turn on more than one LED or other illumination source at once on the same target area, such as opposing or oppositely angled illumination sources.

As also illustrated in the example of FIG. 3, at the right hand side, the relative reflectance of each actuated LED's color or wavelength is measured by conventional circuitry or software for amplifying 112 and integrating 114 the output of the photodiode detector D12, and directing this signal or information to a sample and hold stage 116. That stage 116 provides an output signal indicated here as $V_{out}$ when released by an enabling signal input shown from circuit 110, which also provides an accompanying "Data Valid" signal. As discussed, the corresponding LED pulsing and detector sampling rate is sufficiently non-critical and rapid for sampling each of multiple reasonable size color test patches on a normal size copy sheet moving by the spectrophotometer even for a high speed printer moving sheets rapidly through its paper path. However, by briefly pulsing the common LED driver chip voltage source to provide brief LED drive currents above what is possible in a continuous mode, higher flux detection signals can obtained and the test patch can thus be interrogated in a shorter time period. In any case, by integrating the signal, such as with capacitor C1 and integrator 114 here, enhanced signal to noise ratios can be achieved.

It may be seen by those skilled in the art from that FIG. 3 shows a relatively simple and straightforward circuit. It can be readily implemented in an on-board hybrid chip architecture to provide a very compact and cost effective device.

An additional conventional LED light emitter and detector may be integrated or separately mounted to detect black and white fiduciary or control signals from the black and white fiduciary or timing marks 33 shown on the test sheet 30 of FIG. 4 to indicate the presence of each adjacent test patch 31 in the field of view of the spectrophotometer. However, it will be appreciated that with sufficiently accurate sheet timing and positional information already conventionally provided in the printer 20 controller 100 that such fiducial marks 33 may not be needed, and the time of passage of the respective test patches 31 past the imaging area of the spectrophotometer detector will be already available from the known timing position of the lead edge of each test sheet 31 within the paper path 40.

Also illustrated in the Figs. is an automatic spectrophotometer recalibration system. It is generally known in the art that individual calibration of each of a spectrophotometer's LED spectral energy outputs may be done by using a standard white tile test target for the spectrophotometer to convert each LED measurement to reflectance values. However, it has been discovered that where the spectrophotometer is mounted in the sheet path of a printer, as shown herein, that this calibration can be done frequently, automatically, and without removing the spectrophotometer from the printer. That is, with the spectrophotometer 12 placed at one side of the paper path 40 of the moving sheets in a printer a standard white calibration tile test surface such as 47 shown in FIGS. 2, 5 and 6, may be placed oppositely from the spectrophotometer 12 on the other side of the paper path 40, but in the field of view of the photosensor D12 and its lens system 13, so that, as shown in FIG. 6 (in contrast to FIG. 2) during any selected, or all, of the inter-sheet gaps (the normal spacing between printed sheets in the sheet path of the printer) a re-calibration can be carried out without having to move or refocus the spectrophotometer.

Figure 6:
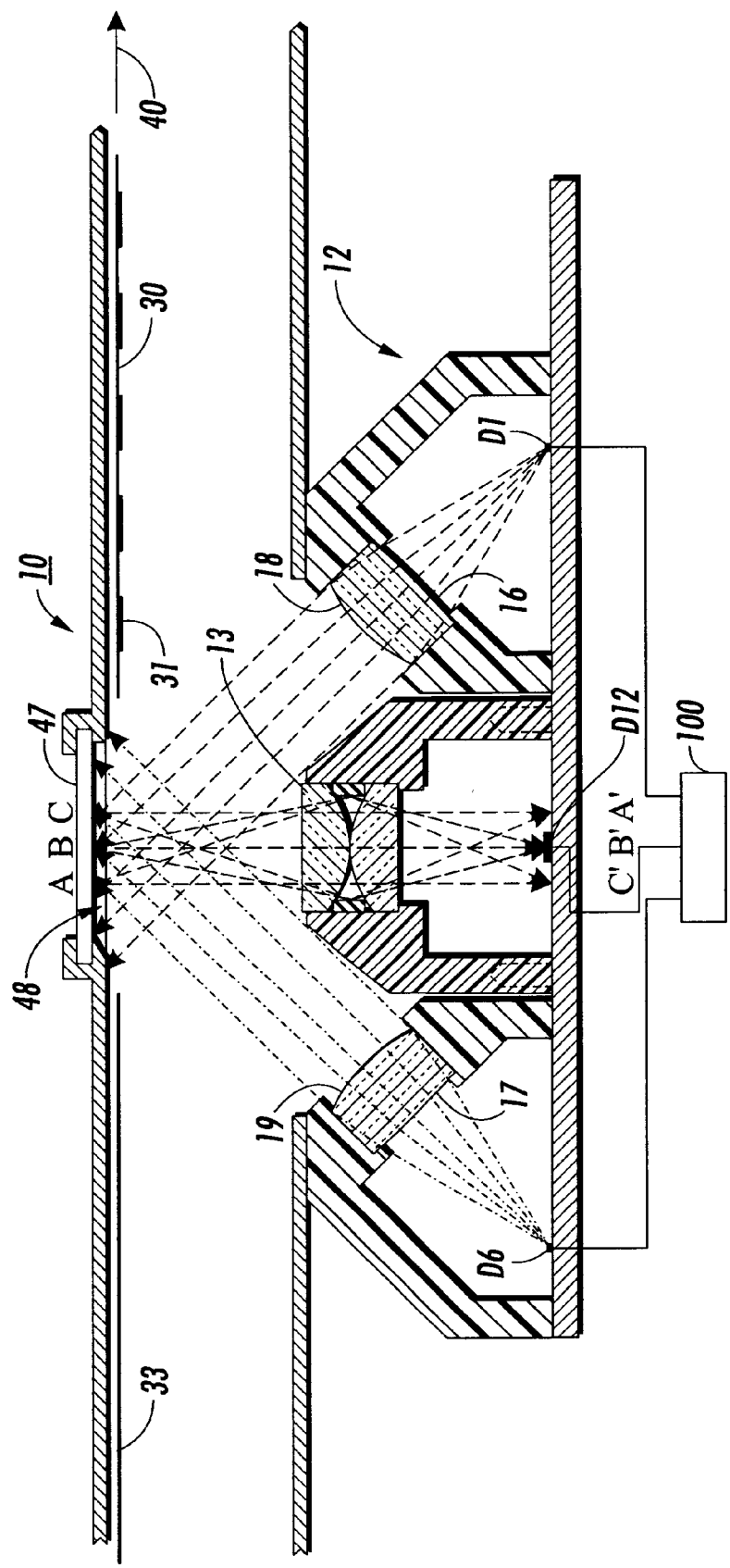
FIG. 6 is the same view as FIG. 2, but showing the relative position of the printed sheets in the printer output path when an an additionally disclosed automatic re-calibration is being accomplished in an inter-sheet gap by the sequential illumination, and detection of reflections from, a white tile standard calibration test surface mounted on the opposite side of the printer output path from the spectrophotometer of FIGS. 1, 2, 3, and 5.

Specifically, when no sheet is present in the output path 40 in the sensing position or target area of the spectrophotometer 12, such as in the time interval between printing sheets, as in FIG. 6, and/or before and after print cycles, the spectrophotometer 12 can alternatively see and be calibrated by an (optional) standard white tile test surface or calibration plaque 47 mounted on the opposite side of the sheet output path 40.

This may be a simple test target area 47 on (or outside of, as shown) the opposite side of the paper path 40. It does not have to be in focus for the lens system 13 or the photosensor D12, merely large enough to be fully illuminated within the field of view. This standard white calibration target 47 may be taped, glued or painted on the existing paper path baffle there. Preferably, as illustrated herein, this calibration test target 47 is a removable plate which is slide-mounted so as to be readily removable from the printer for cleaning, replacement, or substitution of a grey or other different color test tile for diagnostics or other purposes.

As shown, this calibration test target 47 is preferably spaced behind a aperture 48 in that baffle. That is, as shown in FIGS. 2 and 6, the white tile target patch 47 may mounted outside of the output path 40 by being mounted outside of the opposing paper path baffle but still be visible to lens 13 through both the paper path 40 and a hole such as 48 in that baffle. That can help to reduce the contamination of the white calibration surface 47 by keeping it out of contact with passing sheets in the output path 40. The calibration test surface target 47 may be even further spaced outside of the output path 40 than is illustrated here, such as by being mounted on a separate mounting surface spaced behind the baffle aperture, because for the re-calibration process the spacing is not critical, nor is the lens system 13 magnification critical. That is because the calibration test surface 47 is always the same distance from the photodetector D12, since both are in fixed positions, unlike the test patches 31 on the test sheets 30, which can be moving anywhere in between the spaced apart baffles defining the output path 40. A substantially vertical orientation of the output path 40 location of the test surface 47 and the spectrophotometer 12 is preferred, to reduce potential contamination, since the test surface 47 is parallel to the output path 40. However, the disclosed system is not limited to that orientation or output path location.

The calibration target 47 is positioned to be both illuminated and seen by the spectrophotometer 12, as shown in FIG. 6, in between output sheets or otherwise whenever that test target 47 is not covered by a sheet of paper present at that point of time in the paper path 40. The LED's may all be rapidly sequentially actuated to sequentially illuminate this fixed calibration target 47 and thus provide a photodetector D12 electrical signal for each LED's output at that point in time. Of course, this re-calibration need only be done at programmable pre-selected time intervals or machine usage intervals, at machine cycle-ups, and for tech rep diagnostic exercises, not in every inter-sheet gap in the output path 40.

This calibration system can convert the individual output energies of the respective LED's at that point in time on the calibration tile 47 into respective individual reflectance measurement values from the photosensor D12. That calibration data can then be electronically compared to previously stored standard white tile characteristics data in the controller 100, or elsewhere, to provide calibration data for the spectrophotometer 12, which may be used for calibration of its other, color test patch generated, data. The calibration data can also be used to adjust the individual LED output energies to compensate for LED aging or other output changes, by adjusting the applied current or voltage (if that is individually programmable) or by increasing the respective turn-on times of the LEDs, where the photodetector D12 output signal is being integrated, as in this embodiment.

White calibration tiles per se are well known and available commercially from Lab Sphere Co., BCRA, etc. The calibration process itself is well known in the art, especially for initial calibrations. E.g., the X-Rite and Greytag Companies use this method for their grating based devices, and the ColorSavvy and Accuracy Microsensors companies use those techniques routinely.

Initial spectrophotometer calibration data may be stored in an integral PROM IC shipped with the spectrophotometer, if desired. Alternatively, LED output initial calibration data may be programmed into the software being used to analyze the output of the spectrophotometer in other known manners, such as loading it into the disc storage or other programmable memory of the printer controller 100 or system print server.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In a color printer for printing multiple print jobs comprising sequentially printed color sheets, said color printer having a banner sheet printing system for automatically printing banner sheets preceding respective said print jobs, said banner sheets having printed thereon identifying information relating to said print jobs, and said color printer having an output path for outputting said printed color sheets in a process direction, the improvement in said color printer comprising:

a printed colors measurement system, said printed colors measurement system including a spectrophotometer mounted in said output path and a color test prints generation system for periodically printing multiple different color test patches on special said printed color sheets being printed and outputted through said output path as printed color test sheets, said spectrophotometer being adapted to sense said different colors printed on said color test patches on said printed color test sheets in said output path, wherein at least a plurality of said printed color test sheets printed by said color printer with said multiple different color test patches are dual mode sheets comprising said banner sheets printed by said banner sheet printing system with said identifying information printed thereon relating to said print jobs, and wherein said banner sheet printing system and said color test prints generation system are coordinated so that said banner sheet printed identifying information and said multiple different color test patches are printed in different areas of said dual mode sheets so as to not overprint one another.

2. The color printer of claim 1, wherein said multiple different color test patches are printed in a limited area of said dual mode sheets extending across said dual mode sheet in said process direction and said banner sheet printed identifying information is printed on said dual mode sheets outside of said limited area.

3. The color printer of claim 2, wherein said printed test sheets printed by said color printer are additionally printed with multiple fiduciary control marks laterally adjacent to but separate from said multiple different color test color patches, said array of dark fiduciary control marks extending across said banner sheets in said process direction parallel to said multiple different color test color patches.

4. The color printer of claim 1, wherein said color test prints generation system is further adapted to generate a dual mode color test print and banner sheet printed with at least one color test patch corresponding to a color to be printed in said print job for which said dual mode sheet is said banner sheet.

5. The color printer of claim 1, wherein said dual mode sheets are automatically printed by said coordinated said banner sheet printing system and said color test prints generation system for sequential said print jobs with different said multiple color test patches, so as not to interrupt said printing of multiple print jobs printed sheets yet provide frequent different inputs to said printed colors measurement system.

6. A method of color printing in a color printer which automatically prints and outputs printed sheets through an output path in a process direction, including printed sheets which are banner sheets printed with banner sheet information relating to a subsequently printed print job, which color printer is provided with a color measurement system for measuring printed colors on printed sheets in said output path, comprising:

automatically printing an array of multiple color test patches for said color measurement system on a multiplicity of said automatically printed banner sheets, said array of multiple color test patches being printed in an area of said banner sheet extending across said banner sheet in said process direction, and said printed banner sheet information being printed on said banner sheet outside of said area of said banner sheet in which said array of multiple colored test patches is printed, wherein different said automatically printed banner sheets are automatically printed with different said arrays of different color test patches.

7. The method of color printing of claim 6, wherein at least part of said subsequently printed print job is to be printed with at least one specific color, further comprising printing on said banner sheet for said print job at least one color test patch corresponding to said specific color to be printed in said subsequently printed print job.

8. The method of color printing of claim 6, wherein said automatically printed banner sheets with said automatically printed arrays of multiple color test patches are only printed in between said print jobs so as not to interrupt normal printing of normal said printed sheets yet provide frequent color re-correction inputs.

9. The method of color printing of claim 6, wherein a single said automatically printed banner sheet with said automatically printed array of multiple color test patches is printed per print job for multiple said print jobs so as not to interrupt normal printing of normal said printed sheets yet provide frequent color re-correction inputs.

10. The method of color printing of claim 6, wherein said automatically printed banner sheet is not automatically printed with said array of multiple color test patches when the subsequent said print job in a run of plural print jobs is a black and white print job instead of a color print job.

11. The method of color printing of claim 6, comprising additionally automatically printing a corresponding array of dark fiduciary control marks laterally adjacent to but separate from said array of multiple color test color patches, said array of dark fiduciary control marks extending across said banner sheets in said process direction parallel to said array of multiple color test color patches for controlling said color measurement system.

* * * * *